(12) United States Patent
Emerson et al.

(10) Patent No.: US 11,409,859 B2
(45) Date of Patent: Aug. 9, 2022

(54) WATERMARK FOR MANUFACTURING AUTHENTICITY

(71) Applicant: HEWLETT PACKARD ENTERPRISE DEVELOPMENT LP, Houston, TX (US)

(72) Inventors: Theodore F. Emerson, Tomball, TX (US); Luis E. Luciani, Jr., Tomball, TX (US); Kevin E. Boyum, Roseville, CA (US); Christopher M. Wesneski, The Colony, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 287 days.

(21) Appl. No.: 16/546,862

(22) Filed: Aug. 21, 2019

(65) Prior Publication Data
US 2021/0056191 A1 Feb. 25, 2021

(51) Int. Cl.
*G06F 21/44* (2013.01)
*G06F 3/14* (2006.01)
*G06T 1/00* (2006.01)
*G06F 21/76* (2013.01)
*H01H 71/10* (2006.01)

(52) U.S. Cl.
CPC ............... *G06F 21/44* (2013.01); *G06F 3/14* (2013.01); *G06T 1/0021* (2013.01); *G06F 21/76* (2013.01); *H01H 71/10* (2013.01); *H01H 2239/032* (2013.01)

(58) Field of Classification Search
CPC . G06F 21/44; G06F 3/14; G06F 21/76; G06F 2221/034; G06F 21/57; G06T 1/0021; H01H 71/10; H01H 2239/032; G09G 2330/04; G09G 2330/12; G09G 3/006
See application file for complete search history.

(56) References Cited

U.S. PATENT DOCUMENTS

| | | | |
|---|---|---|---|
| 9,396,335 B2 | 7/2016 | Jaber et al. | |
| 9,604,406 B2 | 3/2017 | Mahdavi et al. | |
| 2012/0300975 A1* | 11/2012 | Chalamala | G06K 9/6292 382/100 |
| 2013/0301872 A1* | 11/2013 | Flaharty | H04N 21/4334 382/100 |

(Continued)

FOREIGN PATENT DOCUMENTS

EP 3275686 A1 1/2018

OTHER PUBLICATIONS

Johnson et al., "Titan: enabling a transparent silicon root of trust for Cloud", Google Cloud, 2018, pp. 1-54.
(Continued)

*Primary Examiner* — Mohammad W Reza
(74) *Attorney, Agent, or Firm* — Nolte Lackenbach Siegel

(57) ABSTRACT

A method for assembling a computing device including initiating a board management controller of the computing device, the board management controller having at least one fuse, forming data to control a video display operatively connected to the computing device to show an image of a watermark, and modifying the computing device. The method also includes blowing the at least one fuse in response to modifying the computing device and adjusting the watermark in response to blowing the at least one fuse.

18 Claims, 7 Drawing Sheets

(56) References Cited

U.S. PATENT DOCUMENTS

2014/0223583 A1    8/2014  Wegner et al.
2017/0262180 A1*  9/2017  Earhart .................. G11C 29/12
2019/0222878 A1*  7/2019  Cocchi ............... H04N 21/2541

OTHER PUBLICATIONS

Saraju P. Mohanty et al., "A VLSI Architecture for Visible Watermarking in a Secure Still Digital Camera (S2DC) Design," Aug. 2005, pp. 1-11, IEEE.

* cited by examiner

WATERMARK FOR MANUFACTURING AUTHENTICITY

BACKGROUND

Computing devices, such as servers and components thereof, may be manufactured, assembled, and tested at various locations. Due to complexities in the manufacturing process, computing devices may be assembled out of order, components may be excluded, and computing devices may be subjected to malicious attacks through both hardware and software. Accordingly, computing devices may be provided to customers that are incomplete, maliciously infected, or otherwise do not meet operational requirements.

DETAILED DESCRIPTION

Figure 1:
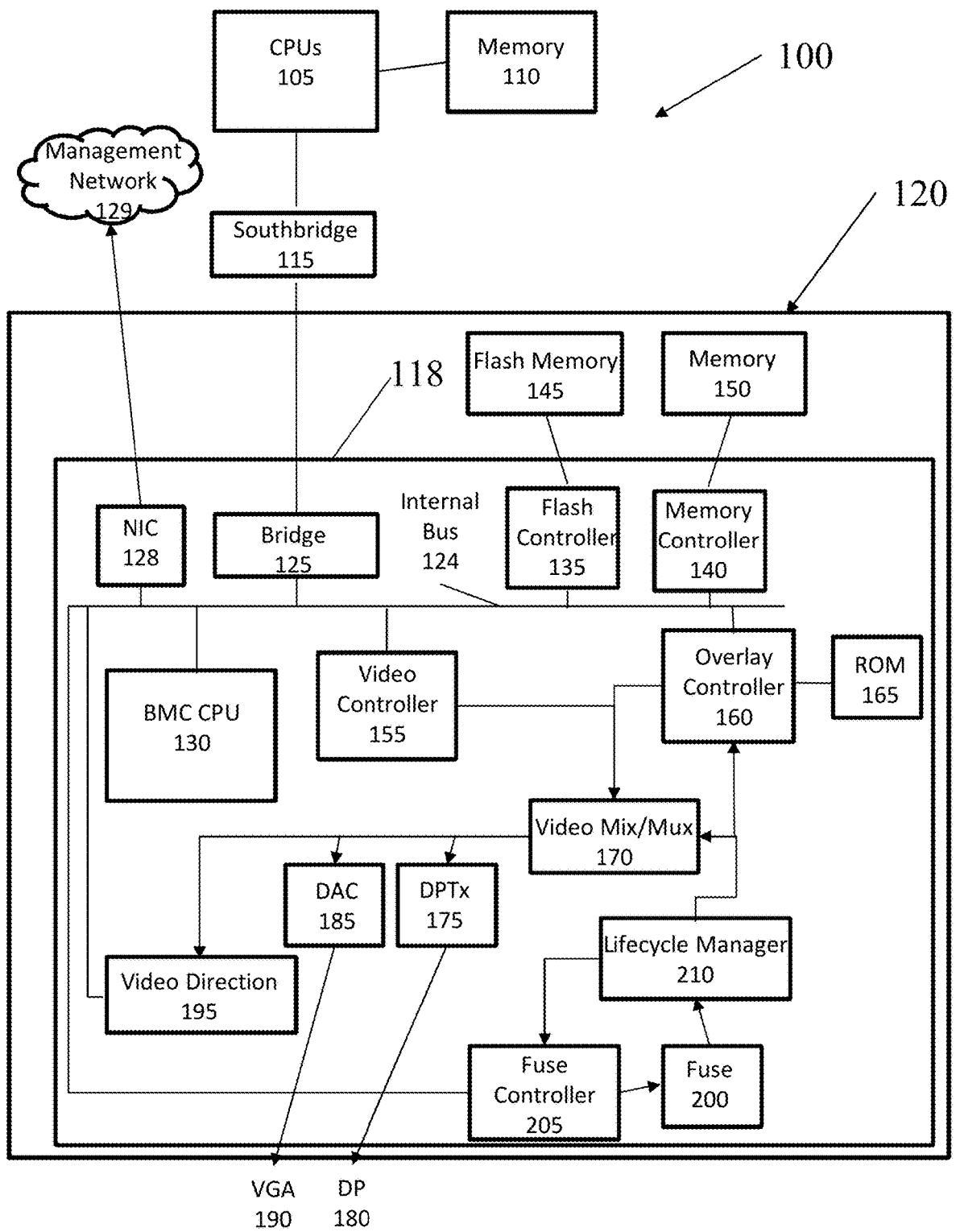
FIG. 1 is a graphical representation of a computing device, according to one or more examples of the present disclosure.

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Computing devices, such as servers, may be used to provide certain functionality to other devices. For example, computing devices may be used to share data or resources between various other devices and/or provide computation across one or more devices. The manufacture of such computing devices is a complex process, as the system board for each computing device includes a number of components. The components may be manufactured, tested, and assembled at different locations. As such, there are numerous points in the manufacture of computing devices where security risks may occur as the result of malicious or erroneous processes.

For example, erroneous processes that may occur during manufacture of computing devices may include manufacturing not occurring in the correct order, shipping a device that is not complete, assembling incorrect components, shipping a device that is not in a secure state, improper assembly, etc. Examples of malicious processes that may occur include installation of malicious software, unauthorized hardware, using unauthorized components, shipping or using imitation products, shipping tampered products, etc. In either instance, the malicious or erroneous processes may result in insecure computing devices, which may fail or otherwise expose an end customer to a malicious threat.

To address the erroneous and/or malicious processes that may occur during the manufacture of computing devices, systems and methods disclosed herein may provide a manufacturing process that prevents a device that has been exposed to such processes from being employed by an end customer. Additionally, should an end customer receive a device that has been affected by such processes, the computing device may alert the end customer of the issue such that the end customer does not employ the computing device.

During manufacture of computing devices, one or more fuses may be used, such that manufacturing may not continue unless a predetermined prior step in the manufacturing process is complete. When a manufacturing step is complete, the fuse may be blown, thereby allowing the manufacturing process to continue. Each fuse in the sequence may thereby either enable or disable a predetermined functionality until it is blown so that the application-specific integrated circuit ("ASIC") knows the state of the manufacturing process for the computing device. The ASIC may then change the functionality of internal management and/or input/output components to provide a watermark of the state of the computing device. By watermarking the computing devices, the progress of the manufacturing for specific devices may be known, and should an error occur in the process, an end user would know that the device may not be secure.

Watermarking is the process of embedding data, called a watermark, tag, label, etc., into a multimedia object, such as an image, video, text, and the like. Watermarks that may be used on computing devices may include a text overlay on video output. For example, video output during manufacture may include a message, such as "Pre-Production System—Not for Sale", "Not Validated", "Not Safe for Use", and the like, which would indicate that the computing device is not ready for shipment to the customer. In order to remove the watermark, the fuses would be blown in the correct order, thereby causing the watermark to no longer be visible. The lack of a watermark would thereby allow the last step in the manufacturing process to know that the computing device is ready for shipment.

Similarly, should a computing device be received by an end customer, the end customer, upon booting the computing device, would have a visual indication that the device should not be deployed. The end customer may then prevent the computing device from being used before potentially exposing an insecure device to an operating environment.

In certain implementations, other types of watermarks may also be used. For example, a different watermark may be used at each step of the manufacturing process. As each fuse is blown, a different watermark may appear. An operator may thus know the state of the manufacturing process based on the watermark that is displayed. If a manufacturing step was missed, the computing device may be sent back to the missed manufacturing step for rectification.

The fuses may also provide additional functionality. For example, fuses blown in an incorrect order or fuses remaining unblown may result in a computing device that is inoperable. In certain implementations, the computing device may not turn on, while in other implementations the computing device may turn off or otherwise reboot after a time interval is reached. By turning off or rebooting, an end customer would know an issue is preventing the computing device from functioning as intended, and as such, the end customer may remove the computing device from operation.

By combining fuses with watermarking, the manufacture of computing devices may prevent erroneous and/or malicious processes from occurring. Should such a process occur, and manufacturer and/or an end user may be provided one or both of a visual indication and/or operational indication that the computing device should not be used.

In addition to providing a visual indication through watermarking, other implementations may include causing a computing device to act in a particular manner or preventing computing device from acting in a particular manner. Watermarking may refer to generation and display of a message, image, or other indication on or over a video display connected to the computing device. For example, in certain implementations if a fuse is not blown, or if fuses are not blown in the correct order, a computer device may be prevented from accessing a network. In other implementations, the computing device may generate periodic resets, thereby not allowing the computing device from functioning as intended. In still other implementations, computing device, or functions thereof, may be disabled. A detailed explanation of manufacturing authentication systems and methods for using such fuses is provided below.

Turning to FIG. 1, a graphical representation of a computing device according to one or more examples of the present disclosure is shown. A computing device 100 may include one or more central processing units ("CPUs") 105 connected to one or more memories 110.

The CPU 105 man be a single core processor, a multicore processor, a processor cluster, or other types of CPUs. The CPU 105 may execute instructions stored in memories 110, such as a random access memory (RAM) connected to CPU 105 via a RAM interface bus, such as double data rate 3 (DDR3), or DDR4 or the like. Memories 110 may be a dynamic random access memory (DRAM) device or a static random access memory (SRAM) device, among other memory devices.

CPU 105 may be coupled to a southbridge 115, or other controller hub, through an interconnect that may vary based on CPU vendor and implementation specifics. Examples of the interconnect may include proprietary interconnects such as the INTEL direct media interface (DMI), or through standard interconnects such as HyperTransport or Peripheral Component Interconnect Express (PCIe), among others.

Southbridge 115 may also couple CPU 105 to circuitry that performs system management functions, such as a baseboard management controller (BMC) 120, through an interconnect. The interconnect may include any number of interconnects over any number of widths. The BMC 120 may include an application-specific integrated circuit (ASIC), such as a BMC ASIC 118, a cluster of ASICs, a single board system, or any number of other configurations. In the example shown in FIG. 1, the BMC 120 includes a single BMC ASIC 118. The BMC 120 may provide a number of basic management utilities for the system, including proprietary functions in accordance with the integrated lights out (iLO) system baseboard management controller, and functions defined by other standards, such as intelligent platform management interface (IPMI), desktop and mobile architecture for system hardware (DASH) or alert standard format (ASF) platform management specifications, among others. In accordance with the standards, the BMC 120 can perform a range of system services such as monitoring physical variables of computing device 100, for example, temperature, power-supply voltage, and operating system functions. Further, BMC 120 may provide other management functions for the computing device 100 such as remote KVM (keyboard video mouse), virtual media, among others.

BMC 120 may include a bridge 125 to couple to the interconnect from the southbridge 115. Bridge 125 may function as an interface between the interconnect and an internal bus 124. The internal bus 124 may include any number of configurations, such a serial bus, a parallel bus, or high speed interconnects that couple different logic blocks, e.g., circuits on a single die or multiple dies, together.

BMC 120 may include a BMC CPU 130. BMC CPU 130 may execute code to support functions for the BMC 120. As an example, BMC CPU 130 may be instructed to obtain and temporarily save an update for BIOS code to be implemented at a later time. BMC CPU 130 may use a network interface controller ("NIC") 128 in BMC 120 to obtain the updated BIOS code from a management network 129. A memory controller 140 may be used to store the temporary copy of the BIOS code to a memory 150 that is operatively connected to or part of BMC 120.

Further, the BMC CPU 130 may be used to assist with the functions described in examples herein, such as forming a watermark during computing device manufacturing, assembly, and testing.

BMC 120 may include various components that communicate states of computing device 100. In this example, BMC 120 allows watermarks to be created as video output as a result of certain fuses being blown during the manufacture of computing device 100. In other examples, BMC118 may use similar functionality to change the ability of computing device 100 to start, to connect to a network, to remain connected to a network, or to otherwise function in an operational state. With respect to FIG. 1, BMC 120 may include functionality to provide watermarking functions, which is discussed in detail below.

BMC 120 that includes watermarking functionality may include various components, which may be connected in a number of different ways in order to generate watermarks during the manufacturing process. BMC 120 provided in FIG. 1 is exemplary of one such configuration that may be used to generate watermarks. As discussed above, BMC 120 may include bridge 125, thereby providing communication between BMC 120 and southbridge 115. BMC 120 may further include BMC CPU 130 that is operatively connected to bridge 125, as well as a flash controller 135 and memory controller 140.

Flash controller 135 may include a part of solid-state flash memory that manages a flash file system directory and is connected to a flash memory module 145. Memory controller 140 may be used to perform reads/writes from a memory 150. Memory 150 may include memory for BMC 120 and/or memory partitioned to feed video frame buffers for video controller 155 and/or an overlay controller 160. BMC 120 may further use memory 150 to store captured video sequences and/or store inboard and output networking packet data, and the like. Memory 150 may further provide code and store data for BMC CPU 130.

BMC 120 may further include one or more video controllers 155 that are responsible for the production of a video signal for output on computing device 100. As such, video controller 155 receives drawing and video rendering commands from CPU 105 through bridge 125 and produces the video to be displayed. Video controller 155 is also connected to overlay controller 160, which sources pre-defined images that form the watermarks. The images may be compressed and stored in on-chip read only memory ("ROM") 165.

A video mixer/multiplexor 170 may receive video input from video controller 155 and overlay controller 160. The video may be combined by video mixer/multiplexor 170, thereby allowing a watermark to be superimposed over or layered behind another displayed video. For example, a watermark may be placed on a lower layer than another video, such that commands for programming computing device 100 are visible in the forefront, while the watermark is present in the background. In other implementations, the watermark may be superimposed over other video, so that the watermark is more visible that the other video. The layering of the watermark may vary based on the operational state of computing device 100 and/or the status of the fuses, as will be discussed in greater detail below.

BMC 120 may further include a display port transmitter ("DPTx") 175, which may be used to condition a signal to provide a digital output, such as output to a DisplayPort 180. BMC 120 may also include a digital to analog converter 185, to convert an output from video mixer/multiplexor 170 into an analog output, such as output to a video graphics array ("VGA") connection 190. A video direction block 195 allows for the redirection of digital signals, such that all video output includes the watermark, whether the output is digital or analog and whether the video is viewed locally or remotely through use of, for example, keyboard/video/mouse ("KVM") or other devices that allow user interaction with computing device 100.

BMC 120 may further include one or more fuses 200. Various types of fuses may be used according to example implementations discussed herein. For example, the fuses 200 may include one-time programmable fuses, which are fuses 200 that can only be programmed once, and after they are blown, cannot be reset. Such fuses 200 may be used to lock down certain security features because once the fuse 200 is blown, the affected security parameters would remain fixed and may not be altered.

One type of one-time programmable fuse 200 that may be used is an e-fuse. An e-fuse, or electric fuse, may include polysilicon or metal fuses that may be programmed through electromigration. In such an e-fuse, each one-time programmable cell of the e-fuse is formed from a continuous metal shape that is etched on to the surface of silicon. When a voltage is applied to the metal, electromigration causes enough metal atoms to move that open circuits are formed. When an open circuit is formed, the fuse 200 is blown, and will remain in an open circuit state indefinitely.

Another type of one-time programmable fuse 200 may include an antifuse. An Antifuse works by creating permanent conductive paths between transistors. In contrast to blowing a few by breaking a connection, an antifuse closes a circuit by growing a conductive path. As used herein, blowing an antifuse refers to growing the circuit, thereby creating the conductive path. Examples of antifuses may include dielectric antifuses and amorphous silicon antifuses. Dielectric antifuses use a thin oxide barrier between a pair of conductors and break down the oxide barrier through application of a high voltage pulse. Amorphous silicon antifuses use a thin barrier of non-conductive amorphous silicon between two metal connectors which, when a current is applied, turns the amorphous silicon into a polycrystalline silicon-metal alloy that is conductive.

Fuses 200 may be operatively connected to a fuse controller 205. Fuse controller 205 may be used to signal when a particular fuse 200 is to be blown, e.g., when a certain manufacturing process is complete. Fuse controller 205 may provide a specific voltage that can blow fuse 200, as described above. Fuse controller 205 may further include a lifecycle manager 210. The lifecycle manager 210 may include components that provide instructions as to a predetermined fuse sequence that indicates the state of computing device 100. As such, when a fuse 200 is blown, lifecycle manager 210 may indicate that a new state of computing device 100 is present. Additionally, lifecycle manager 210 may enable/disable certain fuses 200 by providing instructions to fuse controller 205. Thus, lifecycle manager 210 may govern which fuses 200 may be written to at various stages in the manufacturing process.

In operation, computing devices 100 may progress through various manufacturing implementation, which define the different manufacturing processes and/or steps. In each manufacturing implementation, computing device 100 may be modified through, for example, the addition of hardware, the addition of software, diagnostics, testing, optimizing, and the like. Manufacturing implementations may further include the transporting and/or shipping of computing device 100.

At the start of manufacturing, BMC 120 may be connected to or otherwise disposed on computing device 100. BMC 120 may include one or more one-time programmable fuses 200, that are programmed to be blown in a predetermined sequence as the manufacturing process progresses. In one implementation, BMC 120 may include one fuse 200, while in other implementations BMC 120 may include two, three, four, five, or a greater number of fuses 200. In certain implementations, BMC 120 may include a fuse 200 for each step in the manufacturing process.

At the beginning of the manufacturing process, before any of the fuses 200 are blown, a video output may be provided, which displays a watermark over video that is sent from computing device 100. This pre-manufacturing state indicates that computing device 100 is not secure and should not be placed into operation. In the pre-manufacturing state, certain security parameters, certificates, keys, and the like may not be installed on computing device 100. As such, a pre-manufacturing state and associated watermark may inform users that computing device 100 is not in condition for general operation. Additionally, in such a pre-manufacturing state, computing device 100 may not be operational, as will be explained in greater detail below.

As manufacturing progresses, a first fuse 200 may be blown, thereby indicating that a first step, or implementation in the manufacturing process is complete. For example, after assembly of computing device, the first fuse 200 may be blown, thereby indicating that computing system 100 is assembled and ready for testing. The watermark may remain as previously displayed, as computing device 100 is still not in a secure state and should not be placed in operation. In another implementation, the watermark may change as a result of the completion of assembly. For example, the watermark may change to display a message informing a user that assembly is complete, but testing is not complete.

To implement this change, lifecycle manager 210 may provide instructions to the overlay controller 160 to source a different video from ROM 165. The new video may be sent to video mixer/multiplexor 170, where the new watermark will be mixed with other video provided by video controller 155. The combined video including the new watermark may then be viewed externally by a user.

Another aspect of the manufacturing process may include testing the computing device 100. After the computing device 100 is tested, a second fuse 200 may be blown. As explained above, blowing the second fuse 200 may either maintain the same watermark or change the watermark based on the new condition of computing device 100.

In certain implementation, after computing device 100 is tested, the computing device may be ready for shipping. In such a situation, the second fuse 200 may be the last fuse 200. In other implementations, additional manufacturing processes may occur, and as such, more than two fuses 200 may be employed. For example, the manufacturing processes may include twelve steps, including, parts manufacturing, piece parts sub-assembly, chassis assembly, enclosure attachment, motherboard integration, add-on card integration, hard drive integration, CPU and memory integration, assembly testing, node-level testing, and software loading, validation, and optimization.

In some examples, depending on the number or order in which fuses 200 are blown, the state of computing device 100, and thus the functionality of computing device 100 may be altered. For example, with respect to the installation of security parameters, certain security parameters may be installed when a certain fuse 200 remains unblown that allows the security parameters to be installed. If a certain fuse 200 that allows security parameters to be installed is blown, the security parameters may not be installed. After the fuse 200 is blown, and because security parameters cannot be installed, computing device 100 may be protected from modification and/or read/write functionality. Thus, the state of one or more fuses 200 may result in a change of the state of authentication module and thus computing device 100, thereby preventing certain actions while enabling/disabling other actions.

In other implementations, some of the above manufacturing processes may be excluded, while in other implementations other processes may be included. Additionally, each process may have one or more sub-processes. Each process, or sub-process, in the manufacturing process may include use of one or more fuses 200 to indicate when a process is complete. As such, one or more watermarks may represent one or more processes in the manufacturing process.

When computing device 100 is finished, and the last manufacturing process has occurred, the last fuse 200 may be blown. At this point, computing device 100 may be in condition for shipment or use by an end customer. If the final fuse 200 is blown, indicating that no malicious or erroneous processes occurred during manufacture, the watermark may be removed from the display. Accordingly, a user or end customer knows that computing device 100 is secure and may be placed in operation. In certain implementations, if a fuse 200 is not blown, the watermark may remain on the video output, thereby providing indication to a user or end customer that computing device 100 is not secure. In certain implementations, additional fuses may remain unblown, while computing device 100 is in condition for operation. In such implementations, the last fuse 200 in the manufacturing, assembly, and testing process may be a qualifying fuse 200 that indicates that the intended manufacturing procedures are complete. Other fuses may remain unblown to enable/unable certain functionalities of computing device 100.

In other implementations, failure to blow a fuse 200 may result in other actions by computing device 100. For example, an unblown fuse 200 may result in computing device losing network connectivity. In such an example, when a user or end customer boots computing device 100, computing device 100 may not be able to connect to the network, which alerts the user that computing device 100 is not in a secure condition. The inability of computing device 100 to connect to a network may be used alone or in combination with a watermark to indicate to a user the state of computing device 100. In such implementations, computing device may include a network connectivity module as part of the functionality of BMC 120.

In other implementations, failure to blow a fuse 200 may result in the computing device experiencing periodic resets. In such an example, when a user connects a computing device 100 with an unblown fuse 200, the computing device 100 may stay on for a predefined period of time and then automatically reboot. The user would then know that computing device 100 is not stable on the network and alert the user that computing device 100 may not be secure. As explained above, the periodic resetting of computing device 100 may be used alone or in combination with a watermark to indicate to a user the state of computing device 100. Depending on the specific implementation, periodic resets may occur at a time interval such as, for example, every minute, every five minutes, every 10 minutes, or other periods as may be predetermined. The predetermined time period may be selected to allow specific manufacturing tasks, such as board tests, configuration, diagnostics, and the like, to be performed unabated. However, even if certain tasks may be performed, the state of fuse 200 may render computing device 100 inoperable for general computing tasks outside the manufacturing context. In such implementations, computing device may include a periodic reset module as part of the functionality of BMC 120.

In still other implementations, failure to blow a fuse 200 may result in the computing device turning off and not being rebootable. In such an example, when a user turns on a computing device with an unblown fuse 200, the computing device 100 may turn off and may not be restarted. The user would then know that computing device 100 is not in a secure condition. The failure to start may provide an additional protection, preventing computing device 100 from having access to a network or other computing devices within a network. In such implementations, computing device may include a startup module as part of the functionality of BMC 120.

In certain implementations, a plurality of fuse patterns may be used that result in removing watermarks. For example, there may be a pattern of fuses that delineates computing device 100 as being full featured, which includes installation of security keys and a predefined number of manufacturing steps. In other implementations, there may be a staining fuse, which delineates computing device 100 as being a less features, not full features, or otherwise alternative versions. In such an implementations, blowing the fuses 200 in a particular pattern may remove the watermark even if certain security keys are not installed because the security keys are not part of computing device 100. Regardless of the implementation, the watermark may be removed by following a particular sequence of blowing one or more fuses 200.

In certain examples, a visual display of the condition or state of computing device 100 may be displayed through an integrated visual indicator, such as a light emitting diode ("LED"). In such examples, the color or condition, e.g., flashing or steady, of a light, such as a LED, may indicate the condition of computing device 100. Such visual indicators may be used alone or in combination with the other watermarking processes described herein. Furthermore, in certain implementation, specific lights may correspond with specific fuses 200, and as such, when a specific fuse 200 is blown, the condition of a light may change to represent the condition of computing device 100. In one example, blowing fuse 200 may result in a light changing color, turning on, turning off, starting to flash, and the like. Thus, computing BMC 120 may include one or more lights that correspond to one or more fuses, that allow a user to visually determine the state of computing device 100 based on the state of the one or more fuses 200.

As briefly discussed above, BMC 120 may also provide so-called "lights-out" functionality for computing devices, such as computing device 100. The lights-out functionality may allow a user, such as a systems administrator, to perform management operations on computing device 100 even if an operating system is not installed or not functional on computing device 100. In one example, BMC 120 may run on auxiliary power, thus computing device 100 need not be powered on to an on state, where control of computing device 100 is handed over to an operating system after boot. As examples, BMC 120 may also provide so-called "out-of-band" services, such as remote console access, remote reboot and power management functionality, monitoring health of the system, access to system logs, and the like. As used herein, BMC 120 may include management capabilities for sub-systems of computing device 100 and is separate from CPUs 105 that execute a main operating system of computing device 100, which may include a server or set of servers.

In some examples, BMC 120 may be included as part of an enclosure. In other examples, BMC 120 may be included in one or more aspects of computing device 100, such as inclusion in one or more services, e.g., as part of the management subsystem of a server, or connected via an interface, e.g., a peripheral interface. In some examples, sensors associated with BMC 120 may measure internal physical variables of computing device 100, such as, humidity, temperature, power supply voltage, communications parameters, fan speeds, operating system functions, or the like. BMC 120 may also be capable to reboot or power cycle computing device 100. As noted, BMC 120 may thereby allow for remote management of computing device 100, such as, notifications can be made to a centralized station using BMC 120 and passwords or other user entry may be implemented via BMC 120.

In certain examples, BMC 120 may be used to implement the functionality described above with respect to watermarking. In operation, BMC 120 may form data, such as a watermark or other indications as to the state of computing device 100. BMC 120 may then transfer the data to a video display, where the watermark or other indication as to the state of computing device 100 may be displayed to a user. In certain implementations, BMC 120 may allow remote access to computing device 100 through, for example, a virtual KVM switch, thereby allowing a user to determine the state of computing device 100 remotely. In such an implementation, the user may be able to monitor the state of multiple computing devices 100 by remotely accessing computing device 100 through BMC 120.

In certain implementations, when fuse 200 is in a closed state, BMC 120 may send a signal that represents the state of computing device 100. For example, when fuse 200 is in a closed state, e.g., not blown, the signal may include watermark output data that may be used by BMC 120 or other components of computing device 100 to provide information to a video display that includes authentication information, such as a watermark. After fuse 200 is blown, fuse 200 may be in an open state and a different signal may be provided by BMC 120. In certain implementations, an open state of fuse 200 may indicate that computing device 100 is ready to be employed in an operating environment. In other implementations, BMC 120 may include more than one fuse 200 and breaking the circuit in each fuse 200 may result in different information being transmitted by BMC 120, where the information indicates the state of computing device 100.

In order to further explain the functionality and examples of BMC 120, the example of a watermark is discussed below with respect to FIG. 2.

Figure 2:
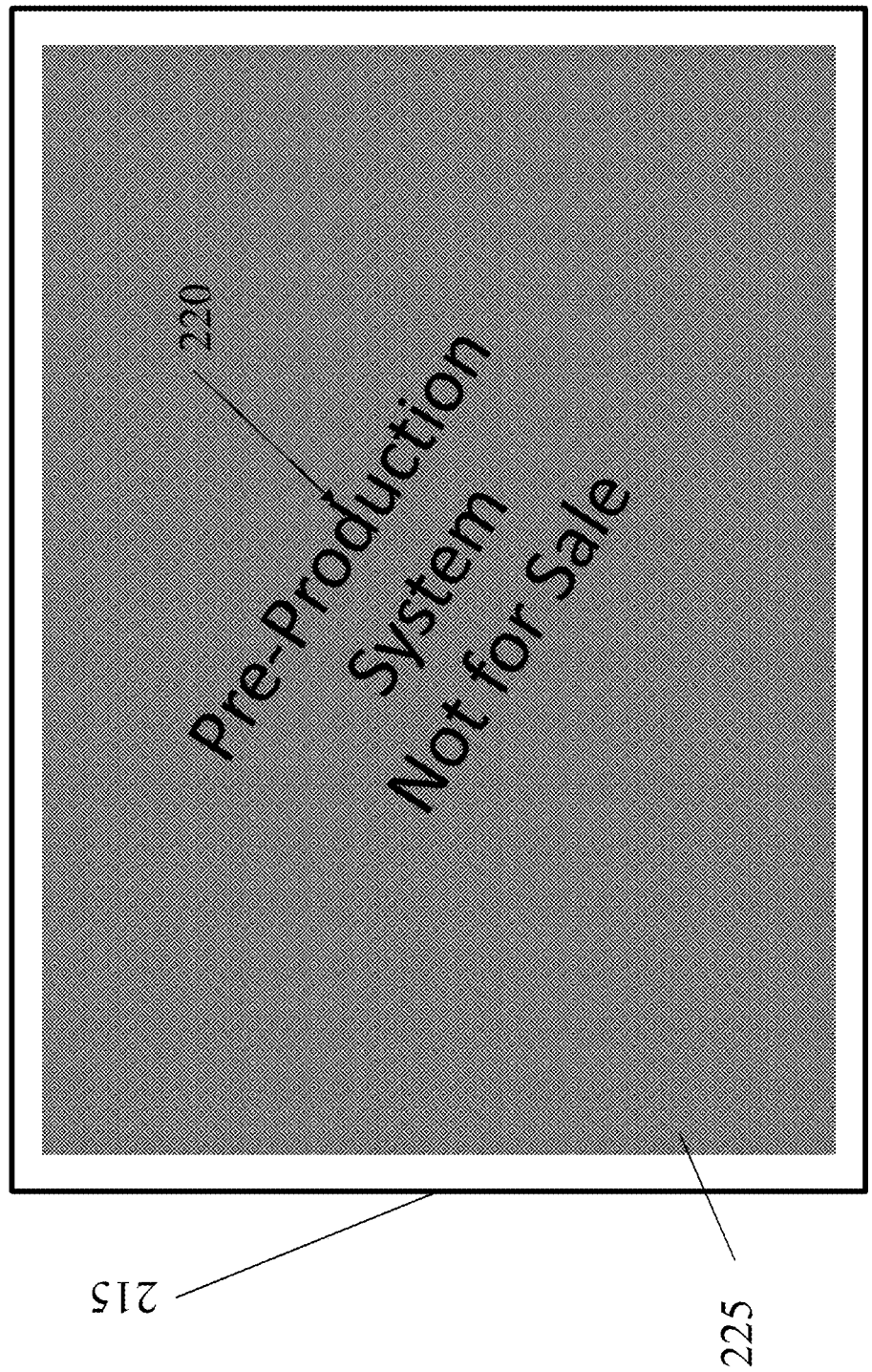
FIG. 2 is a graphical representation of a computing device video output, according to one or more examples of the present disclosure.

Referring to FIG. 2, a graphical representation of a computing device video output according to one or more examples of the present disclosure is shown. FIG. 2 illustrates an output display 215 of a computing device with an authentication module provided by a BMC, wherein the authentication module is a watermark module. As explained above, in response to a modification of the computing device, a watermark 220 may be imposed over other outputted video 225. In this example, outputted video 225 may be present on output display 215, however, watermark 220 may also be displayed.

During operation, a user may access the computing device, interact with the outputted video 225, and otherwise operate on the computing device. However, the watermark 220 may let the user know the current state of the computing device. As previously indicated, a modification to computing device may result in a change to watermark 220, thereby allowing the watermark 220 to communicate to the user the current state of the computing device. In certain implementations, watermark 220 may be removed from output display 215 in response to computing device reaching a secure state.

This is one type of watermark 220 that may be used according to example implementations. In other implementations, watermark 220 may include different verbiage, such as verbiage representative of the state of computing device. Watermark 220 may further include pictorial representations. Watermark 220 may also be layered with respect to other outputted video 225 so that watermark 220 may be on a lower layer than the rest of the outputted video 225 or watermark 220 may be superimposed over other outputted video 225.

Figure 3:
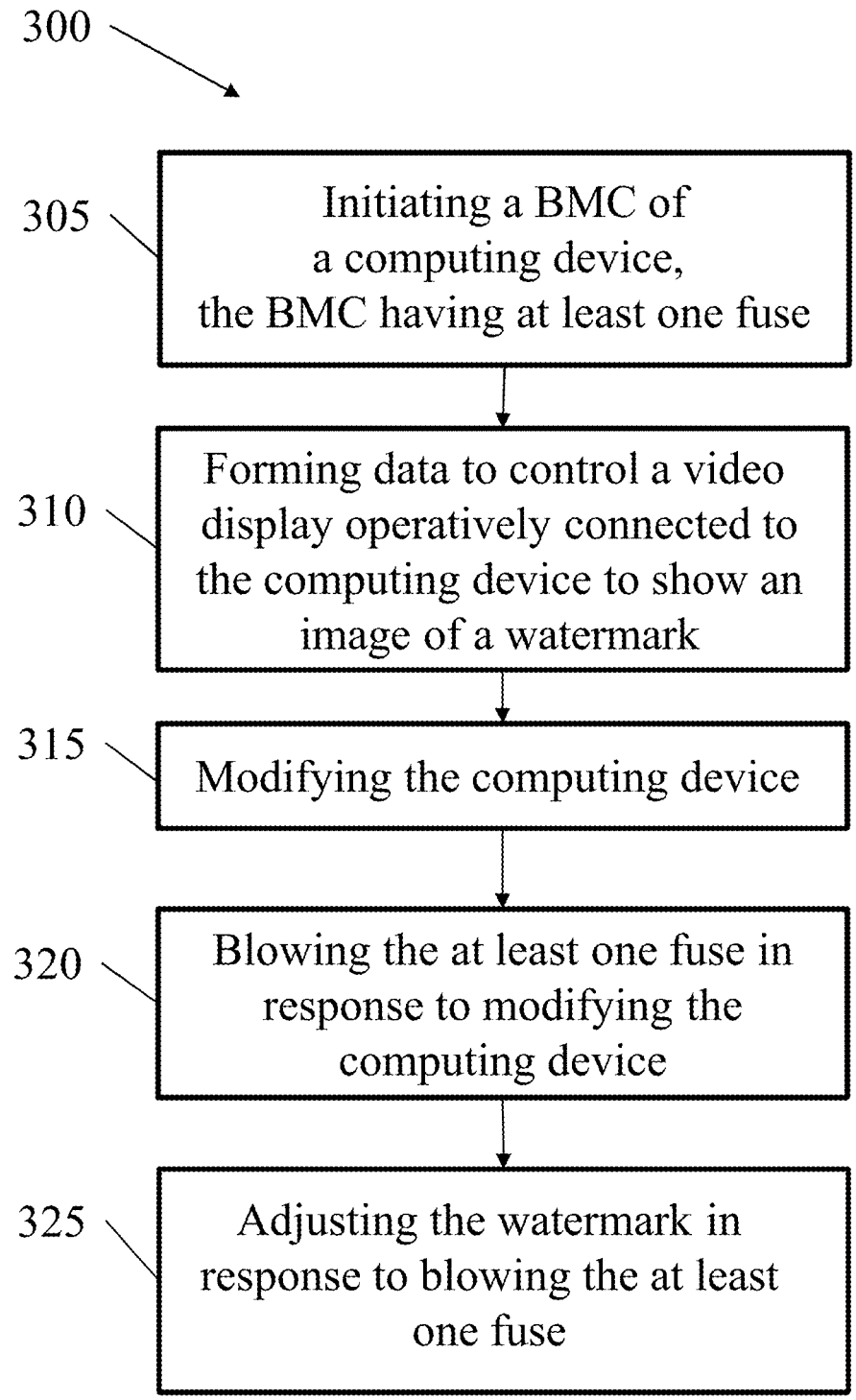
FIG. 3 is a flowchart depicting a method for manufacturing a computing device, according to one or more examples of the present disclosure.

Referring to FIG. 3, a flowchart for a method 300 for manufacturing a computing device according to one or more examples of the present disclosure is shown. In operation, method 300 may include initiating (block 305) a watermark module of the computing device, the watermark module having at least one fuse. As explained above, watermark module may be a part of a BMC, where the BMC may also provide other functionality to the computing device. The BMC including the watermark module may be initiated by providing power to the BMC and/or the computing device. Components of the BMC having the watermark module may be permanently affixed to computing device.

In operation, method 300 may further include forming (block 310) data to control a video display operatively connected to the computing device to show an image of a watermark. The image may include generating a watermark and then displaying the watermark on the video display. During manufacture, computing device may be connected, wired or wirelessly, to one or more video displays. For example, computing device may be connected to a video display through analog connections, digital connections, remote connections, and the like. The video display may be used to access information in the computing device related to the manufacture, testing, installing of software, optimization, etc. Thus, a user may use the video display to interact with the computing device or otherwise monitor or participate in activities related to the manufacturing process.

In operation, method 300 may further include modifying (block 315) the computing device. The modifying may include adding components, such as physical devices to the computing device. The modifying may also include installing a security certificate and/or parameter. The modifying may further include adding components, such as software applications to the computing device. The modifying may further include changing the location of the computing device. As previously mentioned, during manufacture, the computing device may be transported between various manufacturing locations. As such, the location of computing device may be modified. Modification may further include testing aspects of computing device. As explained above, the modifying may include validation checks to ensure the modifications are as prescribed in the manufacturing process, thereby providing for detection and/or prevention of malicious and/or erroneous actions. As such, for example, a malicious attack to the computing device may be attempted. In such a circumstance, the modification may include a malicious attempt by third party software or hardware to affect the operability of the computing device. Accordingly, the modification may include erroneous or malicious actions that occur to the computing device during the manufacturing process. If modifications, such as those described above do not occur as prescribed in the manufacturing process, method 300 may terminate and no further actions may be performed. Such a situation may thereby alert an operator that some action in the manufacturing process has not occurred, or in the instance of a malicious attack, that some action has occurred that should not have occurred. When the check of the modifications has been confirmed, method 300 may continue.

In operation, method 300 may further include blowing (block 320) the at least one fuse in response to the modifying the computing device. Depending on the implementation, the fuse may be a one-time programmable fuse, and as such, it may be capable of blowing a single time. After such a one-time programmable fuse is blown, the state of the fuse cannot be changed. The fuse may be blown by applying a specified voltage to the fuse. As previously explained, the fuse may be either a one-time programmable fuse wherein a connection is broken or blowing a fuse may refer to blowing an antifuse, in which a substance is grown in order to provide a connection.

Blowing the fuse in response to modifying the computing device may further include blowing the fuse in a particular sequence. For example, in certain implementations a watermark module may include a number of fuses. The fuses may be set in a sequence, and as such, the sequence may define the order in which modification to the computing device occurs. For example, a first fuse may have to be blown before a second manufacturing process may begin. In one implementation, a first fuse may be blown at completion of an assembly step of the computing device. The second manufacturing process may include testing of the computing device. Upon receipt of the computing device for testing, if the first fuse is not blown, the computing device may not be tested. By providing a defined sequence for the fuses, the process of manufacturing computing devices may be monitored and controlled.

In certain implementations, a computing device may have a fuse for each of the manufacturing processes or sub-processes. As such, a user may be able to determine the phase of manufacture for a particular computing device based on the state of the fuses.

In operation, method 300 may further include adjusting (block 325) the watermark in response to blowing the at least one fuse. Adjusting the watermark may include replacing the watermark with a second watermark, leaving the watermark as it was previously displayed, and removing the watermark from the video display.

In an implementation where the watermark is replaced with a second watermark, the first watermark may indicate a first process in manufacturing, while the second watermark may indicate a second process in manufacturing. For example, a computing device may enter a first phase of the manufacturing process with no fuses blown and a first watermark being displayed to a user. The computing device may be modified in the first phase of manufacturing, which results in a first fuse being blown. With the first fuse blown, the watermark module may determine that the computing device is ready for a second phase in the manufacturing process. At this point, the watermark module may adjust the video output to display a second watermark. This process may continue with a plurality of fuses, thereby providing a video display, through the watermark, that is representative of the current state of the computing device.

In other implementations, the watermark may provide information indicative of where an error in the manufacturing process may occur. For example, if a computing device is shipped that still has a pre-production watermark, when a user turns on the computing device, the user will see the particular watermark. Upon viewing the watermark, the user is informed that the computing device is still in a pre-production state and the computing device is not ready for operational use. Additionally, the presence of a watermark may be used by a shipping facility to verify the state of the computing device. If the computing device displays a watermark, the facility may be informed that the device is not ready to be shipped. The computing device may then be returned to the appropriate step in the manufacturing process that corresponds to the watermark.

In certain implementations, in addition to a watermark, the fuses may control other aspects of the computing device. For example, the fuses may disable network connectivity of the computing device, generate periodic resets of the computing device, and/or prevent startup of the computing device. In such an implementation, the watermark module may be an authentication module that includes functionality for one or more of the above methods to prevent use of potentially erroneously or maliciously affected computing devices.

As explained above, in certain examples, either independently or in combination with providing a watermark, one or more lights, such as LEDs may be included to indicate the state of a computing device. In such examples, the state of a fuse may be linked to the state of a light, and the light may thereby inform a user as to the state of the computing device.

In certain implementations, computing devices manufactured according to methods disclosed herein may include one or more authentication modules. For example, in one implementation, only one type of authentication module may be used. In other implementations more than one type of authentication module may be used. In still other implementations, two or more types of authentication may be included in one module. By providing authentication modules, such as those disclosed herein, erroneously or maliciously affected computing devices may be prevented from entering operation. Additionally, the authentication modules may prevent such affected computing devices from leaving the manufacturing process, thereby preventing end customers from receiving defective computing devices.

Figure 4:
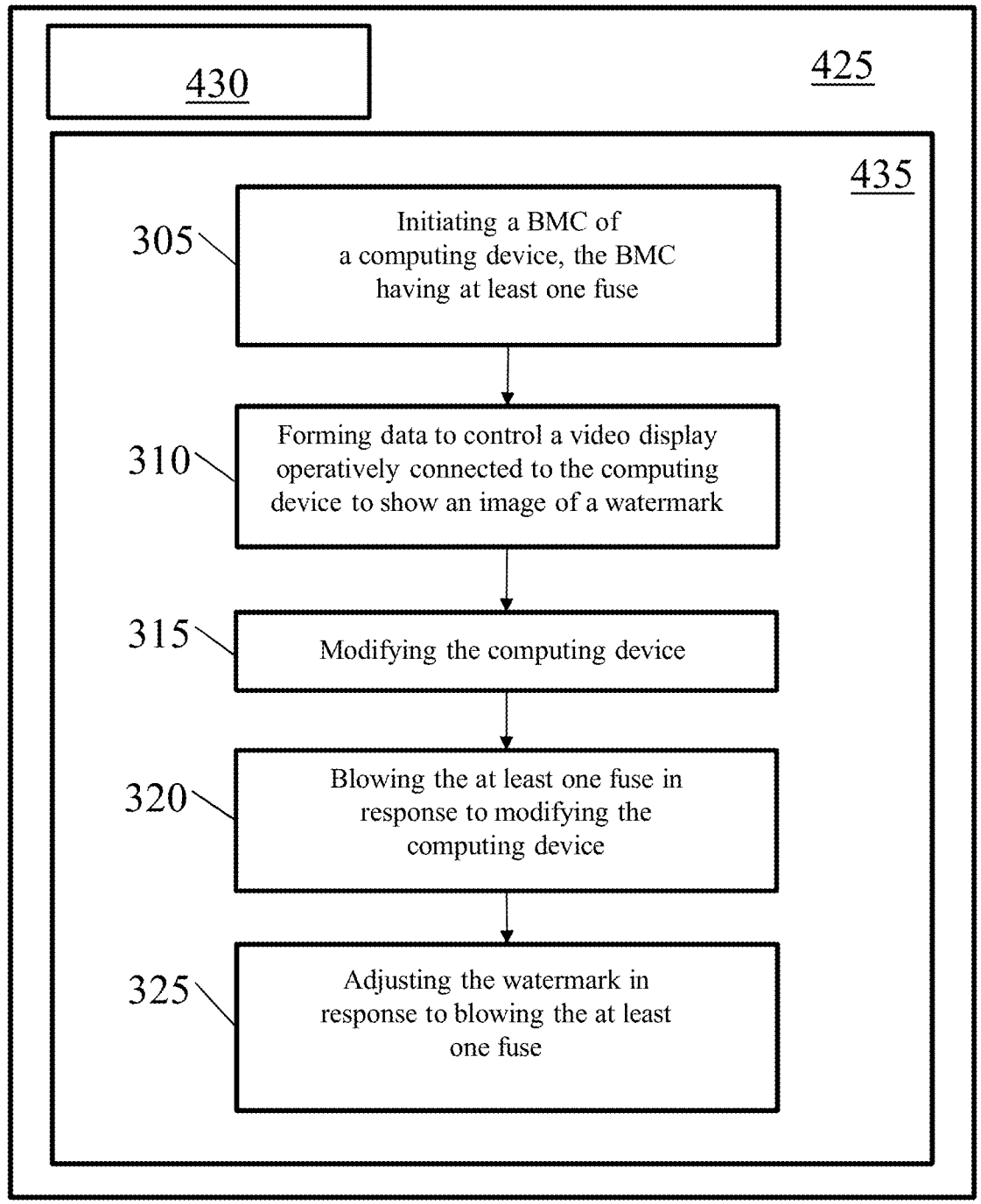
FIG. 4 is an example computing device with a hardware processor and accessible machine-readable instructions, according to one or more examples of the present disclosure.

Turning to FIG. 4, an example computing device with a hardware processor and accessible machine-readable instructions is shown in accordance with one or more examples of the present disclosure. FIG. 4 provides is an example computing device 425, with a hardware processor 430, and accessible machine-readable instructions stored on a machine-readable medium 435 for managing data as discussed above with respect to one or more disclosed example implementations. FIG. 4 illustrates computing device 425 configured to perform the method 300 disclosed in blocks 305, 310, 315, 320, and 325, and discussed in detail with respect to FIG. 3. However, computing device 425 may also be configured to perform other methods, techniques, functions, or processes described in this disclosure.

A machine-readable storage medium, such as 435 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 5:
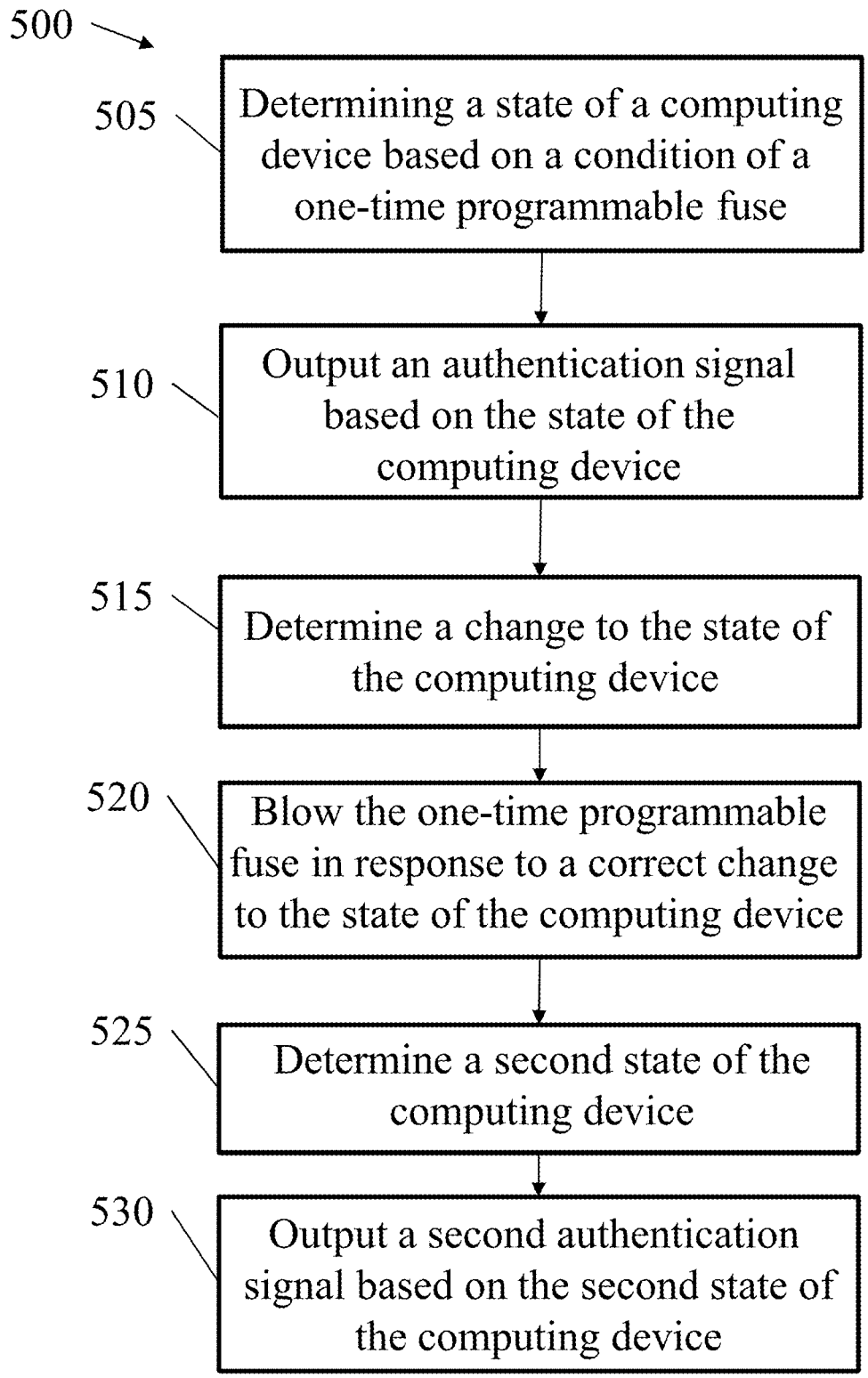
FIG. 5 is a flowchart depicting a method for authenticating computing devices, according to one or more examples of the present disclosure.

Turning to FIG. 5, a flowchart for a method 500 for authenticating computing devices according to one or more examples of the present disclosure is shown. Method 500 may include determining (block 505) a state of a computing device based on a condition of a one-time programmable fuse. As explained above, the one-time programmable fuse may include both fuses and antifuses. The one-time programmable fuse may be programmed to blow in response to certain applied voltages. The state of the computing device may be determined by monitoring whether specific fuses are intact or blown. For example, if a computing device has an unblown fuse, the condition of the computing device may be considered in pre-production, and thus not ready for operation. In another example, if the computing device as no unblown fuses, the computing device may be ready for use by an end customer.

In still other examples, a computing device may have numerous fuses, and the state of the computing devices may be determined based on the sequence of the fuses. For example, in a system with three fuses, if the first fuse is blown but the second and third fuses are unblown, such a placement in the sequence may correspond to a second condition. Similarly, if the first and second fuses are blown, computing device may be in a third condition. Accordingly, a user or end customer may determine the state of a computing device based on the sequence of blown and unblown fuses.

In operation, method 500 may further include outputting (block 510) an authentication signal based on the state of the computing device. An authentication signal may include various signals outputted by an authentication module of the computing device. In one implementation, the authentication signal may include a video output, such as a watermark, that is representative of the state of the computing device. In other implementations, the authentication signal may include a signal that the computing device is not allowed to access a network. In still other implementations, the authentication signal may include a signal that causes the computing device to restart periodically. In other implementations the authentication signal may include a signal that prevents the computing device from starting or otherwise shuts the computing device down when a user attempts a bootup process. Accordingly, the authentication signal may include one or more of a video signal, a network denial signal, a reset signal, and a startup signal.

In certain implementations, multiple authentication signals may be used, thereby providing redundancy to security protections provided to the computing device. When multiple authentication signals are used, the computing device may have one or more authentication modules capable of providing such signals.

In operation, method 500 may further include determining (block 515) a change to the state of the computing device. A state of the computing device may include a state in the manufacturing process or a state that exists as a result of a malicious attack. For example, a state of the computing device may refer to a location in the manufacturing process where the computing device currently resides. The state may also refer to whether the computing device is in a pre-production condition or an operational condition. The state may also refer to a task in the manufacturing process that hasn't been completed or has occurred out of order, thereby preventing a subsequent state of the computing device from occurring. As explained above, if the change to the state of the computing device is an expected and correct change, then the process is allowed to continue. However, if the change to the state of the computing device results is unexpected or incorrect, there manufacturing process may be stopped. For example, if a certain component is expected to have been installed, but is not present, the manufacturing process may be stopped until the incorrect installation is resolved. Similarly, if a malicious attack occurs, thereby potentially compromising the computing device, the manufacturing process may be stopped, thereby informing an operator that an issue has occurred. When the correct manufacturing steps and/or the integrity of the computing device is confirmed, method 500 may continue.

In operation, method 500 may further include blowing (block 520) the one-time programmable fuse in response to a correct change to the state of the computing device. When a change to the state of the computing device occurs, the fuse may be blown, thereby providing indication that the computing device is in a new state. Thus, the fuse may be blown when a step in the manufacturing process is complete, thereby informing a user that the computing device has entered a new state in the process.

In operation, method 500 may further include determining (block 525) a second state of the computing device. The second state may be determined as explained above with respect to determining a state of a computing device (block 505). The second state may thus be representative of a change as a result of blowing the one-time programmable fuse.

In operation, method 500 may further include outputting (block 530) a second authentication signal based on the second state of the computing device. The second authentication signal may include various signals, such as a video output, e.g., a watermark, that is representative of the state of the computing device. In other implementations, the authentication signal may include a signal that the computing device is not allowed to access a network. In still other implementations, the authentication signal may include a signal that causes the computing device to restart periodically. In other implementations, the authentication signal may include a signal that prevents the computing device from starting or otherwise shuts the computing device down when a user attempts a bootup process. Accordingly, the second authentication signal may include one or more of a video signal, a network denial signal, a reset signal, and a startup signal.

In certain implementations, the authentication signal may also include a signal indicating that all fuses in the authentication module have blown, thereby indicating that the computing device is in an operational state. As such, an authenticator, such as a watermark, may be removed from the computing device.

In certain implementations, the order of fuses may be provided in a predefined sequence. The fuse sequence may then be used to prevent manufacturing the computing device out of order. For example, a second step in the manufacturing process may not be allowed to proceed unless a first fuse is blown. Similarly, a third step in the manufacturing process may not be allowed to proceed unless a second fuse is blown. In such an implementation, the third step may be prevented from occurring unless the first and second fuses are blown. Manufacturing errors may thus be prevented by not allowing computing devices from being manufactured out of order.

Figure 6:
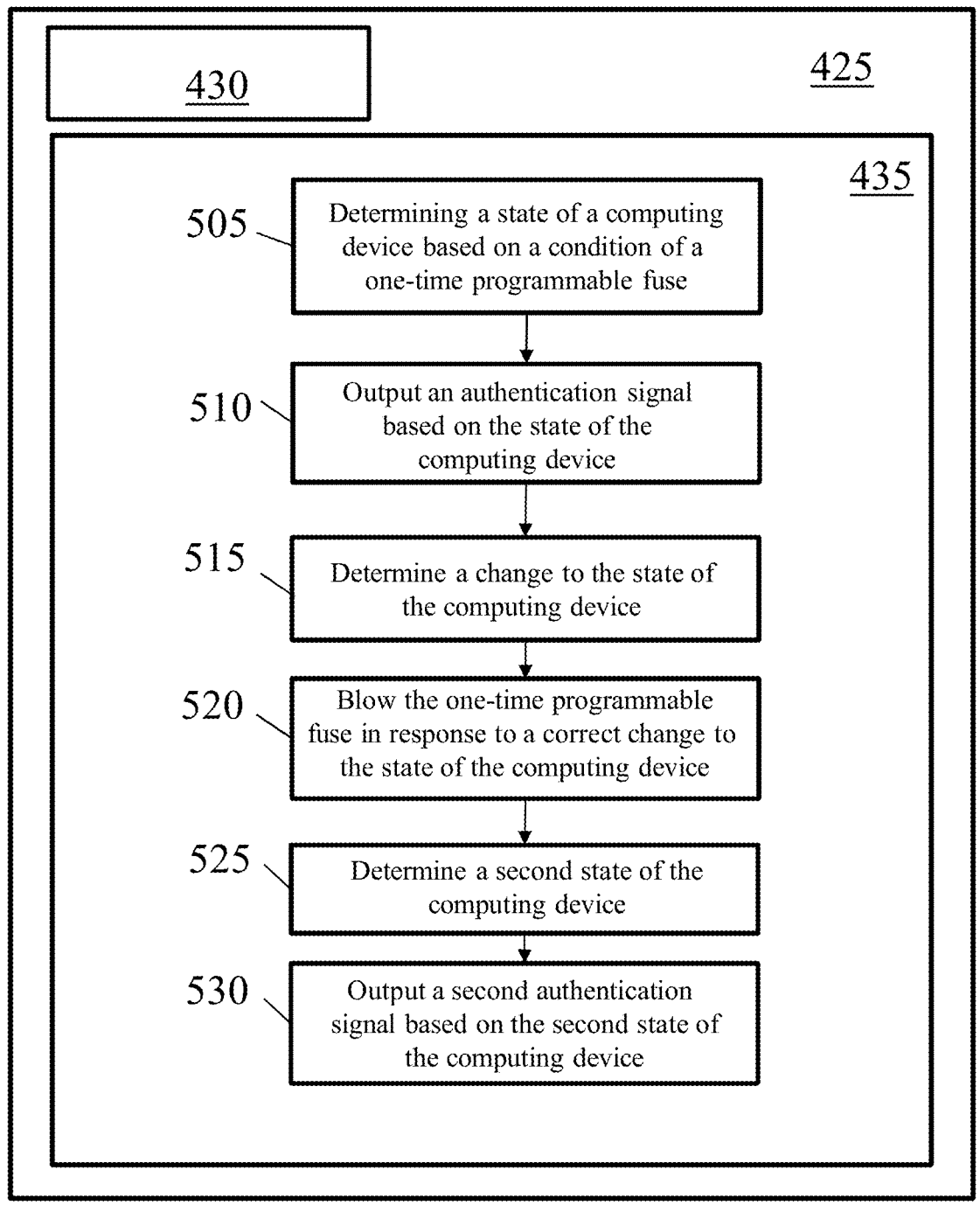
FIG. 6 is an example computing device with a hardware processor and accessible machine-readable instructions, according to one or more examples of the present disclosure.

Turning now to FIG. 6, an example computing device with a hardware processor and accessible machine-readable instructions is shown in accordance with one or more examples of the present disclosure. FIG. 6 provides the same structural components discussed above with respect to FIG. 4, and as such, for purposes of clarity, only the differences in the figures will be discussed herein. FIG. 6 provides is an example computing device 425, with a hardware processor 430, and accessible machine-readable instructions stored on a machine-readable medium 435 for managing data as discussed above with respect to one or more disclosed example implementations. FIG. 4 illustrates computing device 425 configured to perform method 500 disclosed in blocks 505, 510, 515, 520, 525, and 530, and discussed in detail with respect to FIG. 5. However, computing device 425 may also be configured to perform the flow of other methods, techniques, functions, or processes described in this disclosure.

Figure 7:
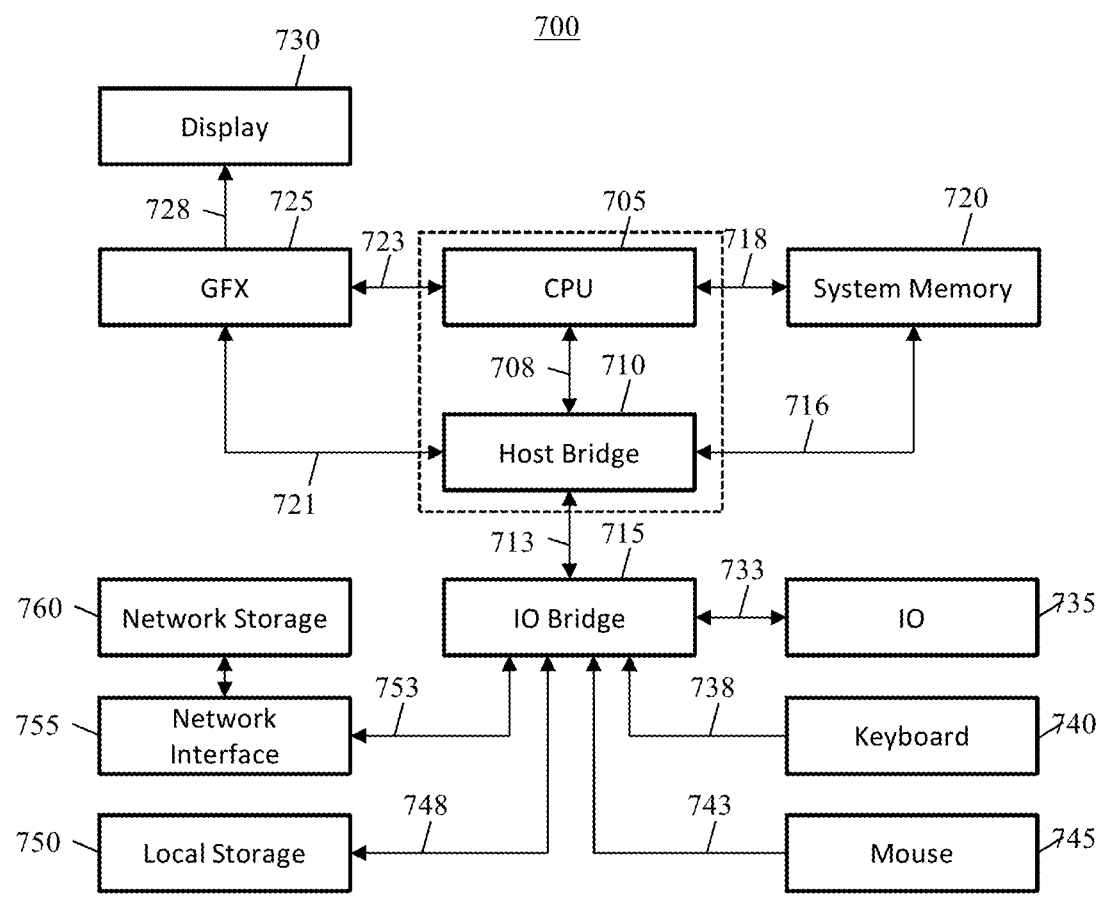
FIG. 7 is a schematic representation of a computing device that may be used to implement functions and processes, according to one or more examples of the present disclosure.

Referring now to FIG. 7, a schematic representation of a computing device 700 that may be used to implement functions and processes in accordance with one or more examples of the present disclosure is shown. FIG. 7 illustrates a computing device 700 that may be used to implement the systems, methods, and processes of this disclosure. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware.

FIG. 7 shows a computing device 700 in accordance with one or more examples of the present disclosure. Computing device 700 may be used to implement aspects of the present disclosure, such as an orchestrator, a gateway manager, a cloud monitor, a local storage, a cloud-based storage, or any other device that may be used implementing the systems and methods for managing data discussed herein. Computing device700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing device 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain embodiments, CPU 705 may integrate the functionality of GFX 725 and interface directly (not shown) with display 730. Host bridge 710 may include an interface 708 to CPU 705, an interface 713 to IO bridge 715, for embodiments where CPU 705 does not include interface 718 to system memory 720, an interface 716 to system memory 720, and for embodiments where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi, Bluetooth, or any other network protocol suitable to facilitate networked communications. Computing device700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing device 700 and may be accessible to computing system 700 via one or more network interfaces provided by one or more network interface devices 755.

One of ordinary skill in the art will recognize that computing device700 may include one or more application specific integrated circuits ("ASICs") that are configured to perform a certain function, such as, for example, hashing (not shown), in a more efficient manner. The one or more ASICs may interface directly with an interface of CPU 705, host bridge 710, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge

710, IO bridge 715, or ASICs or various sub-sets, super-sets, or combinations of functions or features thereof, may be integrated, in whole or in part, or distributed among various devices in a way that may vary based on an application, design, or form factor in accordance with one or more example embodiments. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing device 700, an application specific computing system (not shown), or combination thereof, may be disposed in a standalone, desktop, server, or rack mountable form factor.

One of ordinary skill in the art will recognize that computing device 700 may be a cloud-based server, a server, a workstation, a desktop, a laptop, a netbook, a tablet, a smartphone, a mobile device, and/or any other type of computing system in accordance with one or more example embodiments.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to prevent erroneously assembled or maliciously infected computing devices from reaching end customer.

In one or more examples, systems and methods disclosed herein may be used to secure the manufacturing of computing devices.

In one or more examples, systems and methods disclosed herein may be used to identify computing devices that are not in an operational state In one or more examples, systems and methods disclosed herein may be used to authenticate computing devices prior to deployment.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A method for assembling a computing device, the method comprising:
    initiating a baseboard management controller of the computing device, the baseboard management controller having at least one fuse;
    forming data to control a video display operatively connected to the computing device to display an image of a watermark before blowing any of the at least one fuse, the watermark indicating whether an erroneous process or malicious process has occurred in the assembling of the computing device;
    modifying the computing device;
    blowing the at least one fuse in response to modifying the computing device; and
    adjusting the watermark to be displayed in response to blowing the at least one fuse.

2. The method of claim 1, wherein the adjusting the watermark comprises removing the watermark from the video display.

3. The method of claim 1, wherein the adjusting the watermark comprises replacing the watermark with a second watermark, wherein the second watermark represents a second modification to the computing device.

4. The method of claim 1, wherein the at least one fuse comprises a one-time programmable fuse.

5. The method of claim 1, further comprising displaying the watermark to a user of the computing device.

6. The method of claim 1, further comprising performing, in response to the at least one fuse not being blown, at least one of:
    disabling network connectivity of the computing device;
    causing resets of the computing device; or preventing startup of the computing device.

7. The method of claim 1, wherein the blowing the at least one fuse comprising creating an open circuit in the at least one fuse.

8. A method for assembling a computing device, the method comprising:
    initiating a baseboard management controller of the computing device, wherein the baseboard management controller comprises a plurality of fuses, wherein a second fuse cannot be blown until a first fuse is blown, and wherein blowing of the plurality of fuses is for respective different phases of assembling the computing device;
    forming data to control a video display operatively connected to the computing device to display an image of a watermark;
    performing modifications of the computing device in the respective different phases in a given order;
    blowing the plurality of fuses in a specified sequence in response to performing the modifications of the computing device in the given order; and
    adjusting a display of the watermark in response to blowing the plurality of fuses in the specified sequence.

9. The method of claim 1, wherein the modifying the computing device is part of a manufacturing process of the computing device, and wherein the watermark if displayed after the modifying of the computing device indicates that the erroneous process or the malicious process has occurred in the assembling of the computing device.

10. The method of claim 9, wherein the modifying the computing device comprises adding components to the computing device, and wherein the blowing the at least one fuse is in response to adding the components to the computing device.

11. The method of claim 9, wherein the modifying the computing device comprises loading software in the computing device, and wherein the blowing the at least one fuse is in response to loading the software in the computing device.

12. The method of claim 1, wherein the forming the data to control the video display operatively connected to the computing device to display the image of the watermark is performed by the baseboard management controller.

13. The method of claim 2, wherein the watermark when removed indicates the computing device is ready to use.

14. The method of claim 1, wherein the at least one fuse comprises a plurality of fuses in the baseboard management controller, and wherein the baseboard management controller disables blowing of a second fuse of the plurality of fuses until a first fuse of the plurality of fuses is blown, to control an order of blowing of the plurality of fuses.

15. The method of claim 14, wherein the blowing of the plurality of fuses occur in response to respective different phases of the assembling of the computing device.

16. The method of claim 8, wherein the adjusting comprises removing the display of the watermark after a last fuse of the plurality of fuses has been blown, the removal of the display of the watermark indicating that an erroneous process or a malicious process has not occurred in the assembling of the computing device.

17. The method of claim 8, wherein the baseboard management controller disables blowing of the second fuse until the first fuse of the plurality of fuses is blown, to control an order of the blowing of the plurality of fuses.

18. The method of claim 8, wherein the watermark indicates whether an erroneous process or malicious process has occurred in the assembling of the computing device.

* * * * *